Jan. 17, 1950  P. F. HANSEN  2,494,757
TRACTOR HITCH

Filed April 12, 1946  3 Sheets-Sheet 1

INVENTOR
Peter F. Hansen
BY Rudolph L. Lowell
ATTY.

Jan. 17, 1950     P. F. HANSEN     2,494,757
TRACTOR HITCH
Filed April 12, 1946     3 Sheets-Sheet 2
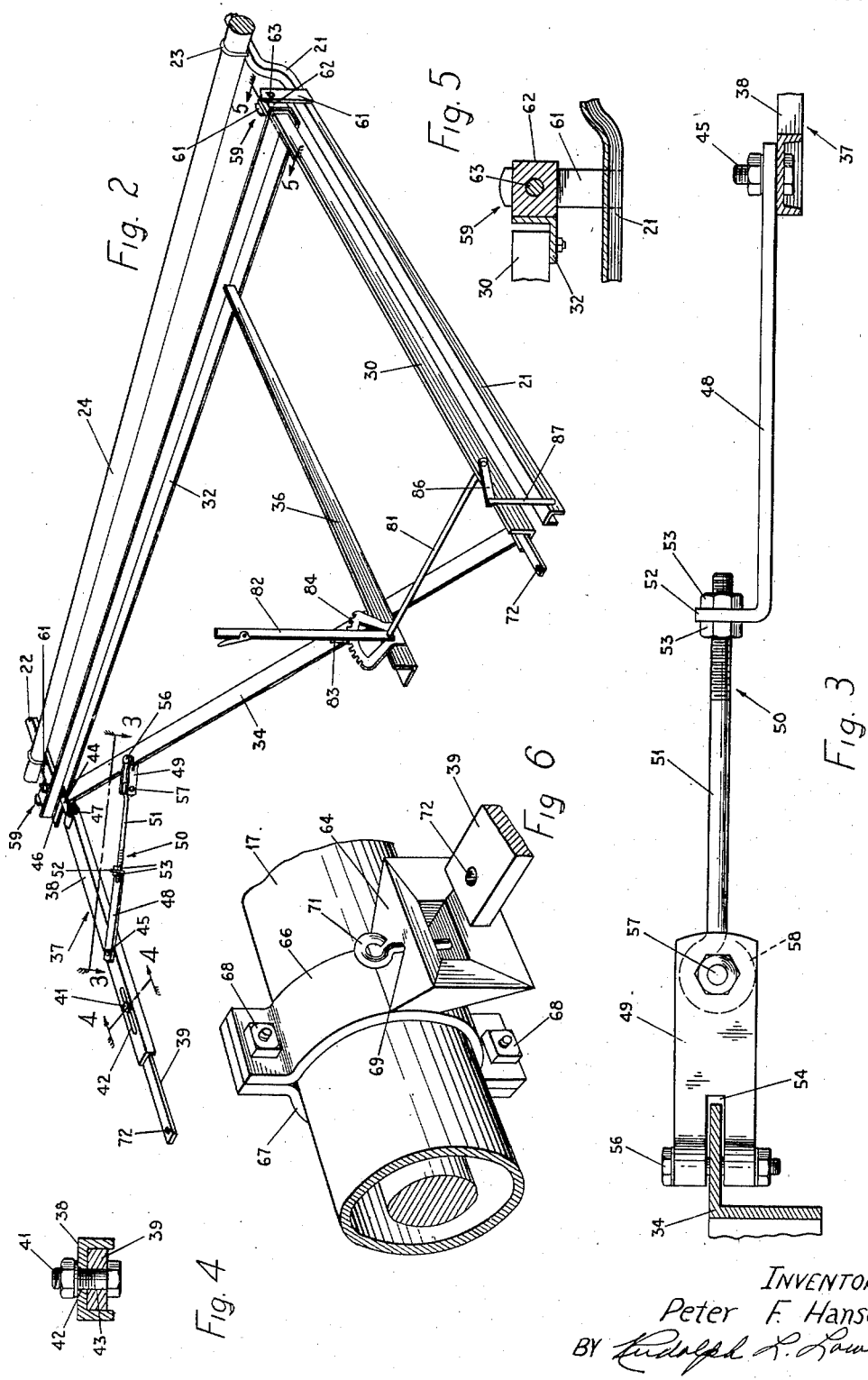
INVENTOR
Peter F. Hansen
BY Rudolph L. Lowell
ATTY Jan. 17, 1950 P. F. HANSEN 2,494,757
TRACTOR HITCH
Filed April 12, 1946 3 Sheets-Sheet 3
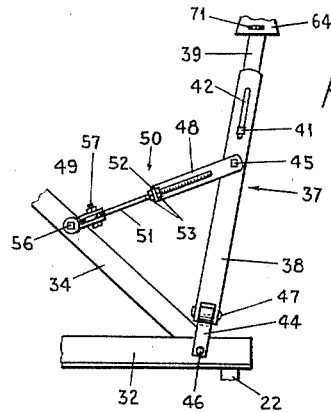
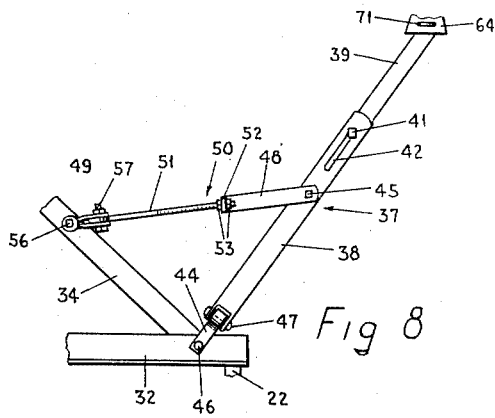
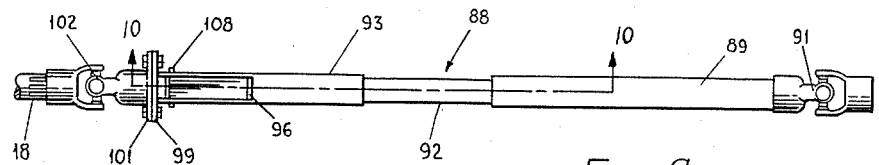
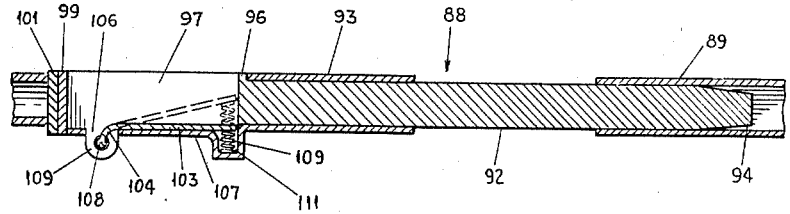
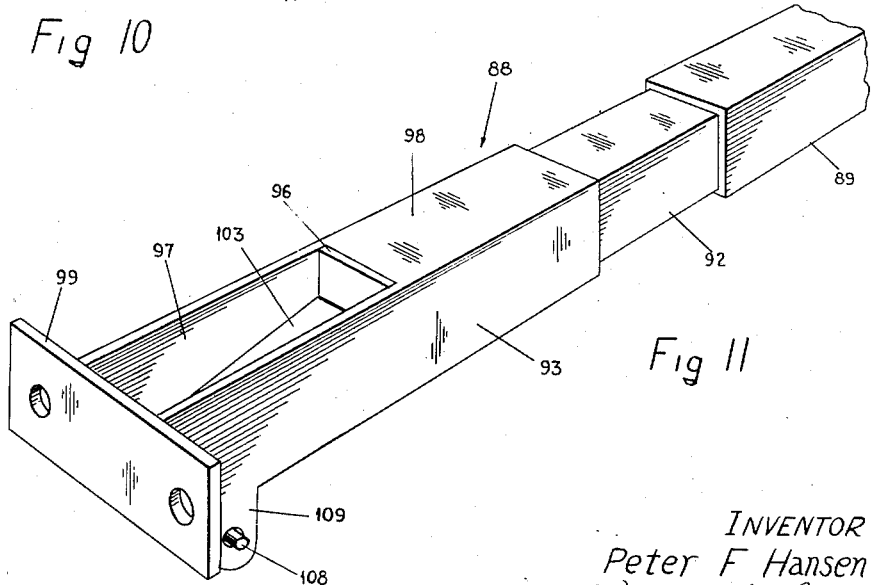
INVENTOR
Peter F Hansen
BY Rudolph L. Lowell
ATTY Patented Jan. 17, 1950

2,494,757

UNITED STATES PATENT OFFICE 2,494,757

TRACTOR HITCH

Peter F. Hansen, Independence, Iowa

Application April 12, 1946, Serial No. 661,611

2 Claims. (Cl. 280—33.44)

This invention relates generally to tractor hitch attachments and in particular to hitch and power shaft attachments for assembling a pull type corn picker with a tractor.

Corn pickers are of two general types, namely, a pull or tractor drawn type and a tractor mounted type. Some of the advantages of a tractor mounted picker over the usual tractor drawn picker are the location of the picker snouts forwardly of the tractor operator so that the rows of corn can be easily followed, the picking of corn substantially to the ends of a corn row, and the support of the picker against lateral movement relative to the tractor whereby the picker is in a following relation with the tractor in fields which are sloped or inclined in a direction normal to the rows of corn.

However, tractor mounted pickers are not entirely satisfactory because of the inconvenience and time required to mount and remove them from the tractor. The tractors are thus generally tied up, during the corn picking season, against use for other farm work. Further, if the corn fields are located remotely from the farm house the picker must be taken back and forth with the tractor, or a separate vehicle used by the farmer for transportation between his home and the corn field.

It is an object of this invention, therefore, to provide an improved hitch and power shaft attachment for connecting a pull type corn picker with a tractor.

A further object of this invention is to provide a tractor hitch for a pull type corn picker, which is capable of holding the picker in longitudinal alignment with the tractor while permitting lateral tipping movement of the picker relative to the tractor.

Yet another object of this invention is to provide a tractor hitch for a pull type corn picker which is adapted to locate the snouts of the picker to one side of the tractor and forwardly of the tractor operator, whereby full visibility is afforded the operator for following a row of corn, and corn is able to be picked substantially to the ends of a row because of the short turning radius required for the tractor and picker assembly.

A still further object of this invention is to provide a tractor hitch for a corn picker which is adapted for permanent assembly on the picker, and capable of being connected to and released from the tractor in a minimum of time so that full use of the tractor is not impaired by periodic corn picking operations.

A feature of this invention is found in the provision of a tractor hitch for a pull type corn picker in which a pair of laterally spaced hitch members are adapted for connection with tractors having rear axles of different lengths.

Another feature of this invention is found in the provision of a tractor hitch for a pull type corn picker in which a first hitch member is formed as a part of the hitch frame. A second extensible hitch member, movably supported at its rear end on the frame in a laterally spaced relation with the first hitch member, is adjustable laterally relative to the first hitch member and supported for up and down pivotal movement on the hitch frame to permit lateral rocking or tipping movement of the picker relative to the tractor, while maintaining the picker in longitudinal alignment with the tractor.

A still further feature of this invention is found in the provision of a connecting unit for a tractor power take-off shaft and a driven shaft on a corn picker, which is capable of being connected and disconnected with a minimum of effort and time and with its connectible part on the tractor, on separation of the unit, being carried on the tractor without interfering with a normal use of the tractor.

Further objects, features and advantages of this invention will become apparent from the following description when taken in connection with the accompanying drawings in which:

Fig. 2 is a perspective view of the hitch attachment shown in assembly relation with a fragmentary portion of the corn picker;

Fig. 3 is an enlarged detailed sectional view on the line 3—3 in Fig. 2;

Fig. 4 is a sectional view as seen on the line 4—4 in Fig. 2;

Fig. 5 is a sectional detail view taken along the line 5—5 in Fig. 2;

Fig. 6 is a fragmentary detail perspective view of a coupling member on the tractor forming part of the hitch of this invention;

Fig. 7 is a fragmentary plan view of the hitch attachment showing an adjustable hitch member;

Fig. 8 is a view illustrated similarly to Fig. 7 showing parts thereof in changed position;

Fig. 9 is a side elevational view of a shaft coupling unit for connecting the tractor power take-off shaft with a driven shaft on the picker;

Fig. 10 is a sectional view as seen on the line 10—10 in Fig. 9; and

Fig. 11 is a perspective view of the shaft coupling unit.

Figure 1:
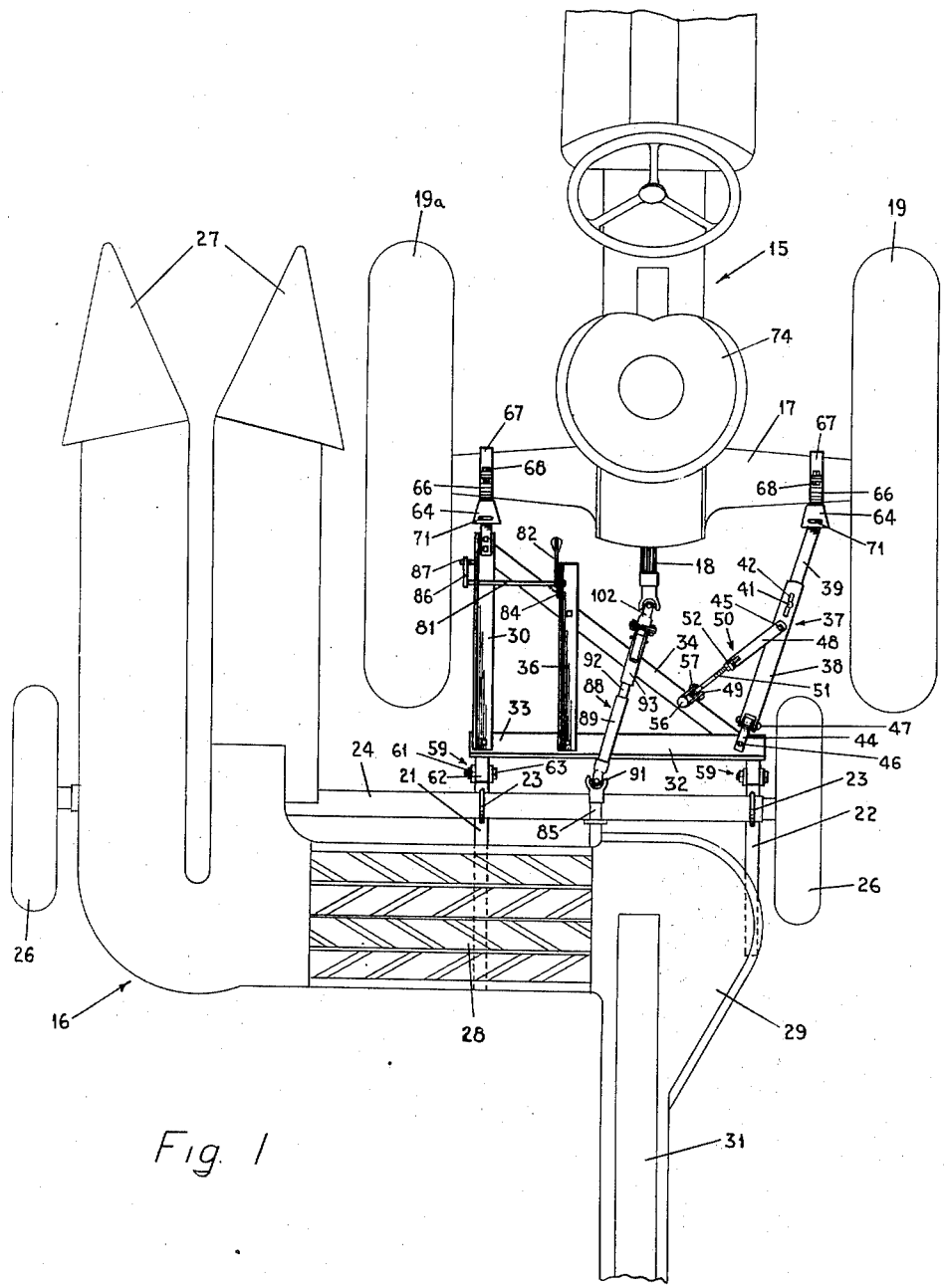
Fig. 1 is a plan view of the tractor hitch attachment of this invention shown in assembly relation with a tractor and a pull type corn picker.

With reference to the drawings the hitch attachment of this invention is illustrated in Fig. 1 in assembly relation with a tractor 15 and a corn picker 16 of a pull type. The tractor includes a rear axle 17, a rear power take-off shaft 18 and rear traction wheels 19 and 19a.

The corn picker 16 is comprised of a main frame or chassis having a pair of transversely spaced longitudinally extended frame members 21 and 22 carried on U clamps 23 which are supported from an axle 24 provided with ground wheels 26. A pair of transversely spaced snouts 27, for guiding the corn stalks into the picker snapping rolls (not shown) are extended forwardly from one end of the axle 24 while husking rolls 28, a corn hopper 29 and an elevator 31, for carrying the picked corn from the hopper into a wagon (not shown), are located rearwardly of the axle 24 and laterally from the snouts 27.

The hitch attachment (Figs. 1 and 2) includes a substantially triangular shaped main frame having a rear transverse frame member 32, a longitudinal frame member 30 extended forwardly from one end 33 of the transverse frame member, and a diagonal brace member 34 connected between the transverse member 32 and the forward end of the longitudinal frame member 30, which constitutes a fixed hitch member as will later appear. A longitudinal brace member 36, spaced inwardly from the hitch member 30 is connected between the transverse member 32 and the brace member 34. It is contemplated that the transverse member 32, hitch member 30, and brace members 34 and 36 be of an angle iron construction.

An extensible hitch member 37 is comprised of a rear channel member 38, faced downwardly, and adapted for telescopic assembly with a front bar member 39. The extension of the bar member 39 to an adjusted position is maintained by a bolt 41 inserted through longitudinally extended aligned slots 42 and 43 formed in the channel member 38 and bar member 39, respectively (Fig. 4).

The hitch member 37 is movably supported on the transverse frame member 32, at a position arranged oppositely from the fixed or rigid hitch member 30, by means including a U-shaped pivoted member 44 (Fig. 2) having its legs in a straddled relation with the horizontal forwardly extended leg of the transverse frame member 32. A pin 46 is received through aligned openings in the legs of the U-member 44 and through the horizontal leg of the transverse member 32 to pivotally support the U-member 44 for pivotal movement in a horizontal plane. The rear end of the channel member 38 is cut away to receive the closed end of the U-member 44 between the legs thereof. A pin 47, carried in the legs of the channel member 38, is extended through the closed end of the U-member 44 and pivotally supports the extensible hitch member 37 for pivotal up and down movement. The legs of the U-member 44 are bent inwardly toward each other and about the pivot pin 47 to retain the pin against movement longitudinally of the U-member 44. It is seen, therefore, that the hitch member 37 is pivotally movable in a horizontal plane about the pivot 46, and in a vertical plane about the pivot 47, for a purpose which will later be apparent.

To lock the hitch member 37 against pivotal movement in a horizontal plane about the pin 46, there is provided an extensible brace unit designated generally as 50 (Figs. 2 and 3), comprised of an arm member 48 and a U-shaped pivoted member 49 connected together by an eye bolt 51. One end of the arm member 48 is secured to the hitch member 37 by a bolt 45 extended through the rear channel member 38. An upright projection 52, at the opposite end, of the arm member 48, has the threaded end of the eye bolt 51 inserted therethrough. The eye bolt 51 is adjustably connected with the arm member 48 by adjusting nuts 53 arranged at opposite sides of the upright projection 52.

The closed or base end of the U-member 49 is formed with a transverse slot 54 of a size adapted to loosely receive the horizontally extended leg of the angle iron brace member 34. A bolt 56 extended through the closed end of the U-member 49 and the brace member 34 pivotally supports the member 49 for pivotal movement in a horizontal plane. The legs of the U-member 49 are bent or pinched inwardly about the bolt 56 to hold the member 49 against longitudinal movement. Supported in the free ends of the legs of the U-member 49 and at right angles to the bolt 56, is a bolt 57 for pivotally supporting the eye end 58 of the eye bolt 51, whereby the eye bolt is pivotally movable in a vertical plane about the bolt 57. It is thus seen, that the length of the brace unit 50 is adjustable, by adjustment of the nuts 53 for the eye bolt 51, and that the complete brace unit is pivotally movable in a horizontal plane about the pivot 56, while the arm 48 and the bolt 51 are pivotally movable together in a vertical plane about the pivot 57 and relative to the U-member 49.

The hitch attachment is carried on the corn picker 16 forwardly of the axle 24 and laterally from the snouts 27 to provide for the rear tractor wheel 19a being positionable between the snouts 27 and the hitch. The hitch is pivotally supported on the picker, for up and down pivotal movement, by a pair of like pivoted connections 59 carried on the longitudinal frame members 21 and 22, of the picker main frame, and arranged at opposite ends of the transverse member 32. The frame members 21 and 22, forwardly of the picker axle 24 are provided with a pair of transversely spaced upright lugs 61. Rearward projections 62, on the upright leg of the transverse frame member 32, extend between the lugs 61 and are pivotally supported on pivot pins 63 carried in such lugs (Figs. 2 and 5).

The forward ends of the hitch members 30 and 37 are connected with the tractor 15 by means including a pair of transversely spaced coupling members 64 (Figs. 1 and 6) carried on bracket members 66 adapted to be secured to the tractor rear axle 17 by clamping members 67 and bolts 68. Each coupling member 64 is of a hollow box construction, opening rearwardly, and having its sides tapered or converged forwardly toward their point of connection with the bracket 66. The top and bottom sides of the coupling members are formed with oppositely arranged holes 69 for receiving a coupling pin 71.

The hitch members 30 and 37 are loosely received within their corresponding coupling members 64 and have holes 72 at their forward ends adapted for alignment with the holes 69 in the coupling members. The flared construction of the coupling members 64 provides for the guiding of the hitch members 30 and 37 therein to positions at which the coupling pins 71 are insertible through the holes 72 at the forward ends of the hitch members and the oppositely arranged holes 69 in the coupling members.

In the assembly of the hitch with the tractor assume the coupling members 64 to be in their supported positions on the tractor rear axle 17, and the tractor in a position for connection with the hitch members 30 and 37. In the event the transverse spacing between the forward ends of the hitch members 30 and 37 does not correspond to the transverse spacing between the coupling members 64, the hitch member 37 may be extended or contracted, concurrently with an adjustment in length of the brace unit 50, to locate the forward end of the hitch member 37 at its corresponding coupling member 64.

In the event the hitch member 37 is contracted, relative to its showing in Fig. 1, to move its front end toward the front end of the hitch member 30, the brace unit 50 is concurrently shortened so that the relative arrangement of the brace unit 50 and the hitch member 37 appears as illustrated in Fig. 7. Should it be desired to extend the hitch member 37, relative to its showing in Fig. 1, to move its front end away from the front end of the hitch member 30, the brace unit 50 is likewise lengthened and the relative arrangement of the hitch member 37 and brace unit 50 would appear as illustrated in Fig. 8. On completion of the adjustment of the hitch 37, the forward ends of the hitch members 30 and 37 are guided within their respective coupling members 64 on a rearward movement of the tractor 15. The coupling pins 71 are then inserted through the coupling members 64 and the hitch members 30 and 37.

In the operation of the hitch its pivoted support on the frame members 21 and 22 provides for a relative up and down movement between the tractor 15 and the corn picker 16 for travel over rough ground. By virtue of the function of the brace unit 50 to lock the hitch member 37 against pivotal movement in a horizontal plane, toward and away from the fixed hitch member 30, the picker 16 is positively retained against movement laterally of the tractor whereby the picker 16 can be operated on sloped or inclined ground without slipping out of a longitudinally aligned position with the tractor. The pivotal support of the hitch member 37 for pivotal movement in a vertical plane about the pivot 47, and the pivotal support of the eye bolt 51 and arm 48 for pivotal movement together in a vertical plane about the pivot 57, accommodates any relative lateral tipping movement between the tractor 15 and the picker 16, while retaining the picker 16 in longitudinal alignment with the tractor. The construction of the hitch for location between the tractor rear wheels 19 and 19a and its connection with the tractor rear axle 17 and with the picker 16 substantially at its axle 24, provides for a close up connection of the picker with the tractor whereby the snouts 27 are capable of being located to the outside of the rear wheel 19a with their front ends positioned forwardly of the tractor seat 74. The forward ends of the snouts 27 are thus clearly visible to the tractor operator and readily guided to follow a row of corn. The close-up connection of the picker 16 also provides for a minimum of turning space, for the tractor and picker assembly, at the ends of the corn rows so that the corn picker can be operated substantially to the ends of the rows.

For the purpose of adjusting the snouts 27 relative to the ground surface the longitudinal frame member 21 of the picker main frame is arranged in a spaced relation below the hitch member 30 and extended substantially to the forward end of such hitch member (Fig. 2). Rotatably supported in the upright legs of the longitudinal brace member 36 and the hitch member 30 is a rock shaft 81 which carries, adjacent to the frame member 36, an operating lever 82 provided with a spring pressed pawl 83. A toothed segment 84, mounted on the brace member 36, cooperates with the pawl 83, in a well known manner, to hold the lever 82 in a moved position. A rock arm 86 fixed on the shaft 81 at the hitch member 30, has its free end pivoted to one end of a link 87 which has its opposite end pivoted at the forward end of the longitudinal member 21. When the hitch attachment is connected with the tractor, movement of the lever 82 provides for a rocking movement of the picker 16 and its axle 24, as a unit relative to the picker ground wheels 26, whereby the snouts 27 are raised and lowered relative to the ground surface.

When it is desired to disconnect the tractor from the picker it is only necessary to remove the coupling pins 71 and drive the tractor away from the picker. By virtue of the rocker shaft assembly 81, 86 and 87 with the picker frame member 21, the hitch is held in a substantially horizontal position so that the forward ends of the hitch members 30 and 37 are retained at elevated positions providing for their later connection with the coupling members 64.

The picker 16 is provided with a driven shaft 85 (Fig. 1) which may be connected through any suitable power transmission means (not shown) with the snapping rolls, husking rolls 28 and elevator 31. The driven shaft 85 is connected with the tractor power take-off shaft 18 through a coupling unit indicated generally as 88 (Figs. 1, 9, 10 and 11).

The coupling units 88 includes a driven shaft section 89, of a square tubular construction, having its rear end connected with the driven shaft 85 through a universal joint 91. Adapted to be locked in telescopic engagement with the tubular driven shaft 89 is a drive shaft member 92, of a square shape in transverse section, slidably supported for longitudinal movement in a tubular casing 93 also of a substantially square shape in transverse section. The rear end 94 of the drive member 92 is of a tapered construction to facilitate its reception within the forward end of the driven tubular member 89, while its front end is formed with an upright projection 96 extended through a longitudinally extended slot 97 formed in the top side 98 of the casing member 93. The longitudinal movement of the drive member 92 relative to the casing member 93 is limited by the engagement of the projection or stop member 96 with the opposite ends of the slot 97. A flange member 99, on the forward end of the casing 93, is adapted to be secured to a mating flange unit 101 formed as part of a universal joint 102, which is connected to the power take-off shaft 18.

Located within the casing 93 is a pivoted stop member 103, extended longitudinally of the casing 93 substantially within the confines of the slot 97. The forward end of the stop member 103 is formed with a downward projection 104 extended through an opening 106 formed in the casing wall 107, located oppositely from its slotted wall, and pivoted on a pin 108 carried in a pair of lugs 109 integrally formed with the casing 93 and arranged at opposite sides of the opening 106. The portion of the casing wall 107 directly opposite the slot 97, is depressed relative to that portion of the wall 107 located rearwardly of the slot 97.

As a result, when the pivoted locking member 103 is positioned against the wall 107, as shown in full lines in Fig. 10, the drive member 92 is movable forwardly, or to the left as viewed in Fig. 10, over the stop member 103 to a stopped position against the forward end of the slot 97. This forward movement of the drive member 92 provides for its disconnection from the tubular driven member 89. The rod member 92 is movable rearwardly into telescopic engagement with the tubular driven member 89 to a stop position defined by the engagement of the upright projection 96 with the rear end of the slot 97. This engagement is maintained by the pivotal movement of the stop member 103, toward the slot 97, into abutting engagement with the forward end of the drive member 92, as illustrated in Fig. 11 and in dotted lines in Fig. 10.

Movement of the pivotal member 103 into engagement with the forward end of the drive member 92 is accomplished by the provision of a coil spring 109 positioned in a socket 111 formed in the casing wall 107 and arranged in compression between the bottom side of the socket 111 and the pivoted stop member 103. It is seen, therefore, that the drive member 92 is positively held against longitudinal movement in telescoped connection with the tubular driven member 89 by the engagement of the upright projection 96 with the rear end of the slot 97, and the engagement of its forward end with the free end of the pivoted stop member 103.

To disconnect the drive member 92 from the tubular driven member 89 the member 103 is manually depressed through the slot 97, to its position illustrated in full lines in Fig. 10, whereby the drive member 92 is movable forwardly over the stop member. When the coupling unit 88 is disconnected the casing 93 and the drive member 92 may be left suspended from the power take-off shaft 18 without interfering with a normal travel of the tractor, while the tubular driven member 87 drops to a supported position on the hitch.

From a consideration of the above description it is seen that the invention provides a hitch for connecting a tractor with a pull type corn picker such that the corn picker is located immediately rearwardly of the tractor with its snouts extended forwardly of the tractor operator. By virtue of this location of the picker snouts, and the construction and relative assembly of the hitch with the picker and the tractor to maintain the picker in longitudinal alignment with the tractor while providing for relative lateral movement between the picker and the tractor, a pull type corn picker is adapted to be operated with substantially all of the advantages of a tractor mounted picker. In addition, the hitch of this invention provides for a quick and simple connection and disconnection of the picker relative to the tractor so that the tractor is available at all times for its many duties on the farm. By virtue of the ease and simplicity by which the tractor is assembled with the picker, the picker may be left in the field and the tractor used for transporting the farmer to and from the field.

Although the invention has been described with respect to a preferred embodiment thereof it is to be understood that it is not to be so limited since changes and modifications can be made therein which are within the full intended scope of this invention as defined by the appended claims.

I claim:

1. A tractor hitch comprising a frame structure adapted to be pivoted on a machine to be pulled for pivotal up and down movement about an axis extended transversely of said machine, a first forwardly extended hitch member on said frame structure, a second forwardly extended hitch member arranged on said frame structure oppositely from and in a spaced relation with said first hitch member, means for contracting and extending said second hitch member, means movably supporting said second hitch member on said frame structure for pivotal up and down and horizontal movement relative to said first hitch member, and means for holding said second hitch member against horizontal movement, with the front ends of said two hitch members being adapted for connection with a tractor at transversely spaced positions thereon.

2. A tractor hitch comprising a transverse frame member adapted to be pivoted on a machine to be pulled for up and down pivotal movement about an axis extended transversely of said machine, a forwardly extended hitch member at one end of said frame member and rigid with said frame member, a second forwardly extended hitch member arranged oppositely from and in a spaced relation with said rigid hitch member, means movably supporting the rear end of said second hitch member on said frame member for up and down and horizontal pivotal movement relative to said rigid hitch member, and means for holding said second hitch member against horizontal movement longitudinally of said frame member but permitting up and down pivotal movement of said second hitch member, with the front ends of said two hitch members being adapted for connection with a tractor at spaced positions thereon.

PETER F. HANSEN.

REFERENCES CITED

The following references are of record in the file of this patent:

UNITED STATES PATENTS

| Number | Name | Date |
|---|---|---|
| 1,848,359 | Krause | Mar. 8, 1932 |
| 1,896,901 | Knapp et al. | Feb. 7, 1933 |
| 1,941,670 | Everett | Jan. 2, 1934 |
| 1,953,063 | Coultas | Apr. 3, 1934 |
| 2,357,761 | Peacock | Sept. 5, 1944 |
| 2,361,304 | Mappin | Oct. 24, 1944 |